METHOD OF MAKING GLYCERINE FROM LIGNIFIED CELLULOSE
Filed May 4, 1959
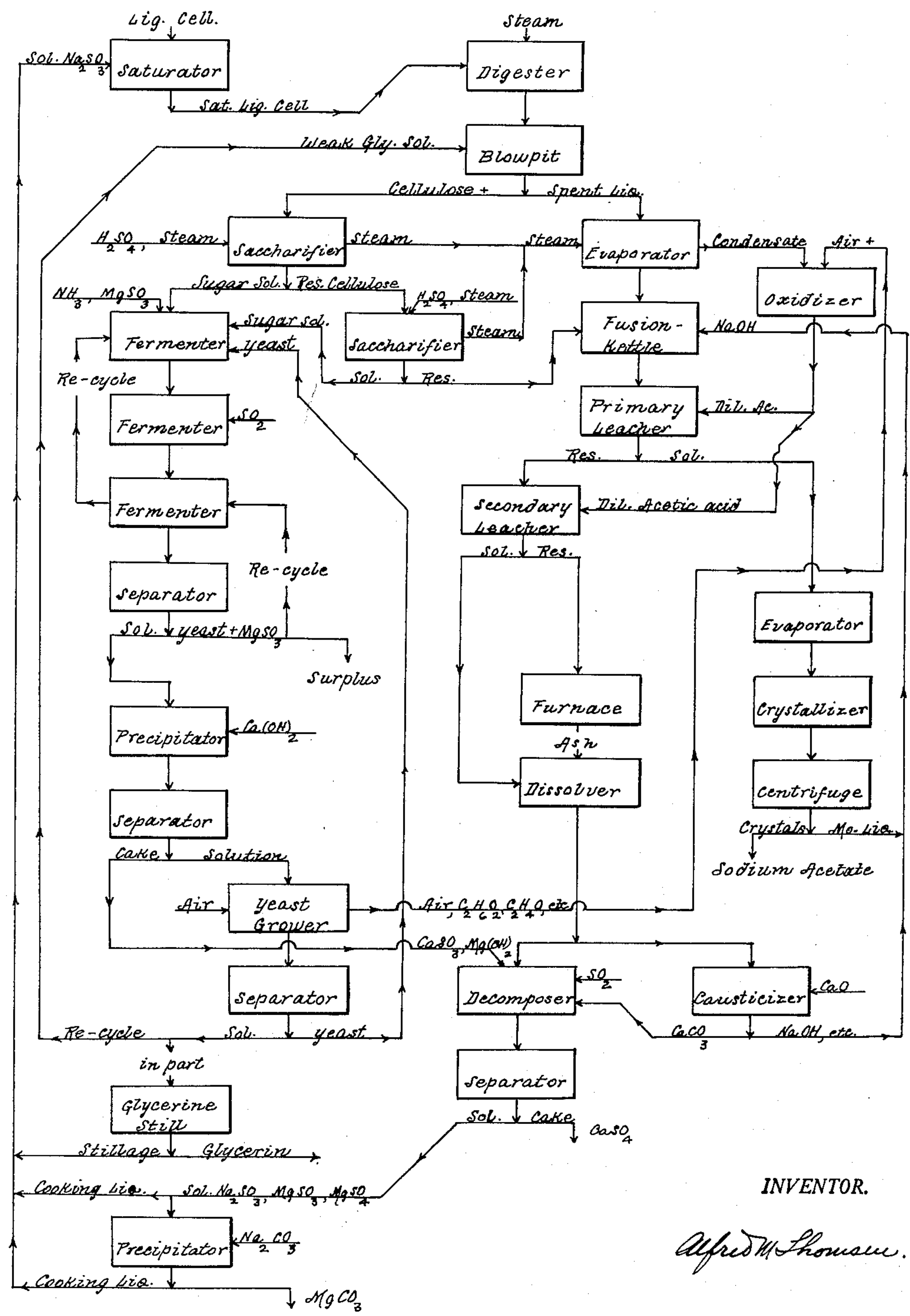
INVENTOR.
Alfred M. Thomsen United States Patent Office 3,003,924

Patented Oct. 10, 1961

3,003,924

METHOD OF MAKING GLYCERINE FROM LIGNIFIED CELLULOSE

Alfred M. Thomsen, 265 Buckingham Way, Apt. 402, San Francisco, Calif.

Filed May 4, 1959, Ser. No. 810,956
2 Claims. (Cl. 195—38)

In sundry co-pending applications I have called attention to the advantages, both technical and economic, that reside in the use of lignified cellulose as raw material for a new development in the fermentation industries. That cellulose may be separated from its original locus in lignified cellulose, that it may be converted into sugar by an acid hydrolysis, that the sugar thus formed may serve as food for a multitude of diverse micro-organisms has been know for many, many years. Obviously, I can lay no claim to any originality in these basic, fundamental concepts upon which my process is based. Nevertheless, I believe that the method in which I have woven together such old knowledge with a radially new approach to constitute something entirely new, operative, and profitable in said fermentation industries is original with myself. It is in the way in which these diverse items sustain one another in forming an integrated process that I have introduced many new steps that render such integration feasible and the collective concept a truly workable process. It is true, however, that a certain part may be "lifted out" of my process and may be of value elsewhere, and if this be done I regard such use as within the limits of this disclosure. The terms, alkali and/or alkali metal as used herein mean sodium or potassium, equivalent to one another.

In my drawing I have represented this fully integrated process, so the best way to describe what I have accomplished is to follow, step by step, the various chemical reactions involved. At the same time I shall point out that which is old and call attention to that which is new, at the same time setting forth the advantages thus realized. It should be noted, specifically, that my aim and object is not merely to make glycerin but also sundry by-products on which the economic value of my process depends. The principal by-product is sodium acetate and to a minor extent, yeast. While the latter will hardly be in the class of human food it will form a valuable protein addition to animal nutrition.

My first step is to make a separation between cellulose and non-cellulose in my raw material. Inasmuch as the vegetable world almost universally uses some form of lignified cellulose as the skeleton which supports the softer tissues, it follows that most material of vegetable origin may serve as my raw material. However, my preference is to that division of said vegetable substances generally referred to as "woody."

In making my separation I prefer to use that form of conventional pulping called the "neutral sulphite process," as said process has the least destructive effect upon the contained cellulose, particularly upon the lower forms in contradistinction to the highly resistant alpha-cellulose. In general such pulping consists in a relatively high-pressure digestion with sodium sulphite as the active agent. In my case it is somewhat supplemented by the presence of magnesium sulphite and/or sulphate, which has no deleterious and perhaps a beneficial effect. Being in every way, save the latter, entirely conventional no fuller instruction is required. The pressure I prefer is about 175 lbs. gage, the sodium sulphite concentration from 40% to 50% of the weight of the raw material.

The time of digestion will naturally vary with the substance involved so all that can be said is to continue said digestion until the raw material has been substantially disintegrated into pulp. On the drawing I have indicated a preliminary saturation of the raw material, suitably comminuted of course, and the subsequent transfer of the mixture to the digester. Such saturation is best effected at or near the boiling point of the solution of sodium sulphite employed.

When finished, the contents of the digester are discharged into the blowpit. While not mandatory I prefer to do this on a continuous basis, the mixture of spent liquor and cellulose pulp being discharged in the form of a jet. Filling the digester will then be upon a continuous basis, likewise, either by pumping or by the use of an old-fashioned "acid egg" activated by steam. In the event such a continuous process is used then the low-pressure steam evolved can be advantageously used elsewhere for evaporator service.

In the blowpit separation is made between the cellulose fraction and the spent cooking liquor, the final stage being a careful washing of the residual pulp by a weak glycerin solution obtained at a later step. The large amount of liquid needed to transfer said pulp to the next step, that of saccharification, as well as during said saccharification, is thus supplied in the form of a relatively weak glycerin solution, containing alcohol and acetaldehyde as well, all that is needed being to add sufficient sulphuric acid to make up an approximate ½% of acid. It is immaterial whether such acidification takes place before said liquor is used in the blowpit, or, as I have indicated in the drawing, in the saccharifier itself. The object of this re-cycling is to increase the glycerin content in final material going to the glycerin still, indicated as the pen-ultimate device on the lower left of the drawing.

Said saccharifier is but another digester, acid-proof of course, in which the mixture of pulp and dilute acid is heated for a matter of minutes to approximately 365° F., corresponding to a gage pressure of 150 pounds. I prefer a continuous discharge as in the case of the digester in which the pulp was made and to diminish the inevitable loss of sugar I perform said operation in two or more stages. On the drawing I have indicated only two, the sugar solution in both cases going to the fermenter while the residual pulp separated from the first stage is once more commingled with dilute acid and re-treated in the second stage. The final residue, which is commingled with spent cooking liquor, is largely lignin and without value in the sugar cycle.

The sugar solution thus obtained and now in the fermenter is then neutralized with ammonia and commingled with a re-cycled magnesium sulphite and with re-cycled yeast and fermented as if for alcohol, hence no description is needed. The conventional pH is maintained by periodic additions of ammonia and sulphur dioxide as indicated. Another feature is that this fermentation is on a continuous basis with recirculation of the almost hexose-sugar-free material in the last vessel in the series into the first one, thus having always a preponderating excess of both yeast and sulphite.

In said fermentation the sugar is converted in part into glycerin, and in part into alcohol and acetaldehyde, some part being used up in yeast growth. In the separator I separate yeast and sulphite of magnesia from the solution which still retains considerable dissolved magnesium sulphite and also the non-fermentable pentose sugars which were refused by the yeast during fermentation, and, of course, the alcohol and acetaldehyde. A "surplus" of yeast and magnesium sulphite is indicated. Separation requires only washing due to the solubility of the sulphite.

In starting such an operation we may, provisionally, adopt a pH of anything between 6.5 and 4.5, a sugar content of 3%, suitable nutrients for the yeast with at least 100 million yeast cells per ml., a sulphite content at least equal to that of the sugar, a temperature around 30° C. Subsequently all these variables will be adjusted to optimum conditions of yield. Again, such yield should be better than 20% of glycerine, 20% of ethanol, between 5% and 10% of acetaldehyde, all calculated on the cellulose of the original raw material. Laboratory determinations indicate that a considerable advance over these amounts is obtainable.

In the "precipitator" the clear solution from the yeast separation is commingled with sufficient slaked lime to decompose the resident magnesium sulphite into calcium sulphite and magnesium hydroxide. As these are both virtually insoluble they are next removed in the subsequent step in the "separator" which may be either a settler, a centrifuge, or a filter. The clear solution resulting is sent to the "yeast grower," the separated solids are properly treated in the respective place in the circuit for the regeneration of the cooking liquor from the original pulping step, to be fully described later on.

Although the fermentable, hexose sugars were refused by the yeast in the fermentation step just described, they form excellent yeast food in the presence of an abundance of air, hence, much yeast is produced and the weak glycerine solution becomes correspondingly purified. Simultaneously, virtually all the volatile acetaldehyde is removed and also much of the ethanol, and both would be lost through dilution were it not that a place is found for this product in the spent liquor recovery system in the "oxidizer," as plainly indicated in the drawing. At the appropriate place in the "spent liquor division" this will be more fully elucidated.

I have next shown the yeast produced in the "yeast grower" as separated, best by a centrifuge, and re-cycled to the first vessel in the fermentation series. In this manner a fresh supply of yeast is continuously being added while "tired" yeast is consistently being withdrawn as "surplus." It is in such matters that the over-all efficiency largely rests. The solution from this yeast separation, after it has been purified from sulphites and now from pentose sugars, is then divided into two parts. One part is re-cycled to the "blowpit," another part to the glycerine still. By the re-cycling, the glycerin content of the material going to the still is automatically raised to any degree desired by the operator. Provisionally, it would be unwise to attempt anything beyond a 3% solution of glycerin.

The re-cycled material still retains a little ethanol, and perhaps even a little acetaldehyde. During saccharification the steam being continuously discharged from the jet will contain most of such material which will then be found in the condensate of the evaporator as indicated, and will meet the "air" previously described in the "oxidizer." A virtually costless, closed cycle is thus established and both ethanol and acetaldehyde become converted into a dilute form of acetic acid in the oxidizer.

Returning now to the "glycerine still," which is entirely conventional both as to design and operation, I have shown the stillage re-cycled to form a component of the cooking liquor employed in the original pulping of the lignified cellulose. The reason for such commingling is as follows: It is unavoidable that a certain amount of acetic acid is formed during all these steps though no cognizance has so far been taken of this fact. Such material is present as calcium acetate in the stillage, and becomes recoverable, en toto, in the spent liquor treatment, now to be described.

The spent cooking liquor, separated from the cellulose in the blowpit, is sent to an evaporator for concentration, the steam required being furnished from the saccharifier. The condensate goes to the oxidizer as previously described and the concentrated liquor to the fusion kettle where it is commingled with sufficient recycled sodium hydroxide so that total organics shall be but one third of the sodium hydroxide present. This is to some extent optional but I find that more rather than less is desirable. By evaporation the water content of the mixture is decreased until the temperature of the "fusion" shall be approximately 230° C. after which it is discharged into the primary and subsequently, into the secondary leacher. In both cases the liquid employed is the dilute acetic acid from the oxidizer. In the first step the object is to obtain a leach liquor very high in sodium acetate and in caustic soda, in the second stage the remainder of the acid is used, the object being as complete an extraction of acetate as is commercially desirable, this weaker liquor being re-used at a later stage.

The concentrated leach liquor from the primary leacher is evaporated and crystallized for sodium acetate, the mother liquor becoming a strong solution of caustic soda for re-cycling to the fusion step. The residue from the primary leacher is retreated in the secondary leacher yielding a weak acetate solution and a residue which is sent to a furnace, actually, any conventional roaster such as is employed in the metallurgical treatment of metallic sulphides. The calcines, or "ash" from said furnace is dissolved in the weak acetate liquor from the secondary leacher and divided into two parts. One part is causticized with lime in the conventional manner yielding a solution of caustic soda, for re-cycling to the fusion kettle, and a sludge of calcium carbonate which is commingled with the second portion of the solution from the dissolver in the "decomposer."

Into said decomposer is likewise commingled the mixture of calcium sulphite and magnesium hydroxide obtained when purifying the fermented liquor prior to its use in the yeast grower. Inasmuch as the solution of "ash" from the furnace is essentially a mixture of the carbonate and sulphate of sodium it follows that the use of supplementary sulphur dioxide in said decomposer will result in the ultimate precipitation of all the resident lime as calcium sulphate, the solution becoming essentially dissolved sodium sulphite with a little unavoidable magnesium sulphite and sulphate.

I have next, and finally, shown this crude solution purified from magnesium, and obviously calcium, by the addition of soda ash in the "precipitator." Magnesium carbonate, with a little admixed calcium carbonate due to the slight solubility of calcium sulphate, is then separated and the purified solution of neutral sodium sulphite is re-cycled as the cooking liquor in the pulping step. Manifestly, the little sodium acetate present in said liquor is thus re-cycled. The over-all effect has been to collect in the form of acetate of sodium all the acetic acid produced as a "side effect" in the fermentation; the acetic acid produced in the oxidation of ethanol and acetaldehyde; and finally the acetyl groups present in the original raw material and converted to sodium acetate in the fusion step; the sole, final product being sodium acetate gathered to a specific locus, to wit: the crystals obtained from the leach liquor in the primary leaching step. Upon the recovery of this important by-product, which has a dollar value at least as high as the glycerine itself, the economics of my process depends. Secondarily, there is the value of the yeast, which on a dry basis should equal about one-half of the weight of the glycerin, which becomes a net gain. Collectively, I believe that glycerin made in this manner will be cheaper than from any other known source.

In thus describing in fullest detail what I have indicated on the drawing I have given my preferred illustration so clearly that any operator familiar with the subjects involved can with ease duplicate my process. As already stated, certain minor items could be omitted making the process less profitable but still workable. However, I consider that as long as the cost of making glycerin is influenced by the type of raw material involved and comprises the recovery of acetic acid, in some form, as well as yeast, then such deviations would fall within the scope of my disclosure. Having thus fully described my process, I claim:

1. The method of making glycerine from lignified cellulose which comprises; digesting said lignified cellulose with a solution of neutral sulphite of an alkali metal under the conventional limitations for such a digestion until the resident cellulose shall have been substantially freed from incrusting material; separating said cellulose from said spent cooking liquor; converting the separated cellulose into sugars by heating with an acid medium equivalent to approximately ½% of sulphuric acid in an incomplete reaction and separating the sugar solution from the residual cellulose; fermenting the sugar solution thus formed in the presence of at least as much magnesium sulphite as there is sugar in said solution with a yeast freshly made at a later step and with re-cycled yeast and sulphite drawn from the last vessel of a series of fermenters and returned to the first vessel, the whole constituting a continuous fermentation cycle; controlling the pH of the circulating fluid by the alternate addition of ammonia and of sulphur dioxide and maintaining said pH between 4.5 and 6.5; continuing said fermentation until the fluid in the last vessel shall be substantially free from hexose sugars and then withdrawing substantially the same amount in volume as the entering sugar solution; separating yeast and suspended magnesium sulphite from the portion thus withdrawn and further purifying the residual solution by adding sufficient calcium hydroxide to precipitate calcium sulphite and magnesium hydroxide and separating said precipitate; removing the pentose sugars still resident in said purified solution by intense aeration in the presence of yeast and recycling the yeast thus produced to the fermentation step; dividing the resultant solution, containing glycerine, ethanol, and acetaldehyde, into two parts; re-cycling one part as the liquid medium in saccharification, thus increasing the glycerine content of the fermenting mass, and passing the other part to a glycerine still for recovery of the resident glycerine; evaporating the spent cooking liquor from which the cellulose was previously separated, using steam generated by the release of pressure in the saccharification step; commingling the condensate from said evaporation with the spent air used in aeration while removing pentose sugars to form a dilute acetic acid for subsequent use; fusing the concentrated spent liquor, after said evaporation, with additional caustic alkali at a finishing temperature of approximately 230° C. and leaching with the dilute acetic previously obtained to form a solution of caustic alkali and alkali metal acetate; crystallizing out the acetate and re-cycling the caustic to the fusion step; roasting the residue to form an ash consisting mainly of alkali metal sulphate and carbonate; dividing a solution of said ash in two parts; causticizing one part with lime and re-cycling the causticized solution to the fusion step; commingling the remainder with calcium carbonate from said causticizing step, with the mixture of calcium sulphite and magnesium hydroxide obtained in purifying the pentose sugar solution, and with sulphur dioxide; separating the calcium sulphate formed; purifying the resulting solution by adding alkali carbonate with attendant separation of magnesium carbonate, thus obtaining a regenerated cooking liquor.

2. The method of making glycerine from lignified cellulose which comprises; digesting said lignified cellulose with a solution of neutral sulphite of an alkali metal under the conventional limitations for such digestion until the resident cellulose shall have been substantially freed from incrusting material; separating said cellulose from said spent cooking liquor; converting the separated cellulose into sugars by heating with an acid medium equivalent to approximately ½% of sulphuric acid in an incomplete reaction and separating the sugar solution from the residual cellulose; fermenting the sugar solution thus formed in the presence of at least as much magnesium sulphite as there is sugar in said solution with a yeast freshly made at a later step and with a re-cycled yeast and sulphite drawn from the last vessel of a series of fermenters and returned to the first vessel, the whole constituting a continuous fermentation cycle; controlling the pH of the circulating fluid by the alternate addition of ammonia and of sulphur dioxide and maintaining said pH between 4.5 and 6.5; continuing said fermentation until the fluid in the last vessel shall be substantially free from hexose sugars and then withdrawing substantially the same amount in volume as the entering sugar solution; separating yeast and suspended magnesium sulphite from the portion thus withdrawn and recycling, in part, the material thus withdrawn to the first vessel in the series; further purifying the residual solution by adding thereto sufficient calcium hydroxide to precipitate calcium sulphite and magnesium hydroxide and separating said precipitate; removing the pentose sugars still resident in said purified solution by intense aeration in the presence of yeast, separating said yeast and re-cycling it to the fermentation step; dividing the resultant yeast-free soluton, containing glycerine, ethanol, and acetaldehyde, into two parts; re-cycling one part as the liquid medium required in the previously described saccharification step, thus increasing the glycerine content of the fermenting mass and distilling the other part in the conventional manner for resident glycerine, the resultant stillage being re-cycled to form a part of a regenerated cooking liquor in order to recover acetates resident therein.

References Cited in the file of this patent

UNITED STATES PATENTS

| | | |
|---|---|---|
| 2,123,211 | Scholler | July 12, 1938 |
| 2,381,052 | Hodge | Aug. 7, 1945 |
| 2,388,840 | Fulmer et al. | Nov. 13, 1945 |
| 2,416,745 | Fulmer et al. | Mar. 4, 1947 |
| 2,430,355 | McCarthy | Nov. 4, 1947 |
| 2,510,668 | Thomsen | June 6, 1950 |
| 2,680,704 | Schneider | June 8, 1954 |